(12) United States Patent
Wood et al.

(10) Patent No.: US 6,877,826 B2
(45) Date of Patent: Apr. 12, 2005

(54) LOCKER SHELF ASSEMBLY WITH SLIDEABLE DRAWER

(76) Inventors: George W. Wood, 1000 Shelard Pkwy., Suite 210, Minneapolis, MN (US) 55426; Robert A. Schweitzer, 4144 Shady Oak Rd., Minnetonka, MN (US) 55343

( * ) Notice: Subject to any disclaimer, the term of this patent is extended or adjusted under 35 U.S.C. 154(b) by 248 days.

(21) Appl. No.: 10/127,988

(22) Filed: Apr. 23, 2002

(65) Prior Publication Data

US 2004/0164655 A1 Aug. 26, 2004

(51) Int. Cl.[7] .............................................. A47B 53/00
(52) U.S. Cl. ...................... 312/205; 108/110; 211/187; 211/190
(58) Field of Search ............................... 312/205, 257.1, 312/265.1, 265, 265.4; 108/42, 106, 107, 110, 193, 159.11; 211/186, 187, 189, 190–192, 195

(56) References Cited

U.S. PATENT DOCUMENTS

| 360,547 | A | * | 4/1887 | Winslow ..................... 108/110 |
| 2,360,452 | A | | 10/1944 | Stone |
| RE28,293 | E | * | 1/1975 | Bustos ......................... 108/107 |
| 3,916,802 | A | | 11/1975 | Virtue et al. |
| 4,117,783 | A | | 10/1978 | Eckel et al. |
| 4,283,099 | A | * | 8/1981 | Burton ......................... 312/351 |
| 4,500,146 | A | * | 2/1985 | Peterson ................... 312/257.1 |
| 4,706,576 | A | * | 11/1987 | James .......................... 108/110 |
| 5,137,160 | A | | 8/1992 | Santucci |
| 5,152,407 | A | | 10/1992 | Massoudnia et al. |
| 5,158,187 | A | * | 10/1992 | Taub ........................... 211/186 |
| 5,205,630 | A | * | 4/1993 | Welch et al. ........... 312/249.11 |
| 5,421,646 | A | * | 6/1995 | McNamara et al. ........ 312/205 |
| 5,641,217 | A | * | 6/1997 | Caruso et al. .............. 312/404 |
| 5,947,036 | A | * | 9/1999 | Cohen ......................... 108/110 |
| 6,015,053 | A | * | 1/2000 | Sheng ......................... 211/188 |
| 6,220,464 | B1 | * | 4/2001 | Battaglia et al. ............ 211/187 |
| 6,302,284 | B1 | * | 10/2001 | Zonshin ....................... 211/187 |

FOREIGN PATENT DOCUMENTS

| FR | 2487452 | * | 1/1982 | |
| FR | 2683128 | * | 5/1993 | ................. 211/187 |

* cited by examiner

Primary Examiner—Lanna Mai
Assistant Examiner—Hanh V. Tran

(57) ABSTRACT

A shelf assembly has expandable shelves connected to upright legs that horizontally support the shelves in a locker. A drawer slidably mounted on one shelf for movement between open and closed positions engages a longitudinal rib to maintain the drawer generally horizontal when the drawer is moved to the out position. The drawer when in the closed position can be moved into a nested position in the shelf to facilitate packaging and display in a flat box. The legs having tight fit connections with the corners of the shelf.

40 Claims, 16 Drawing Sheets

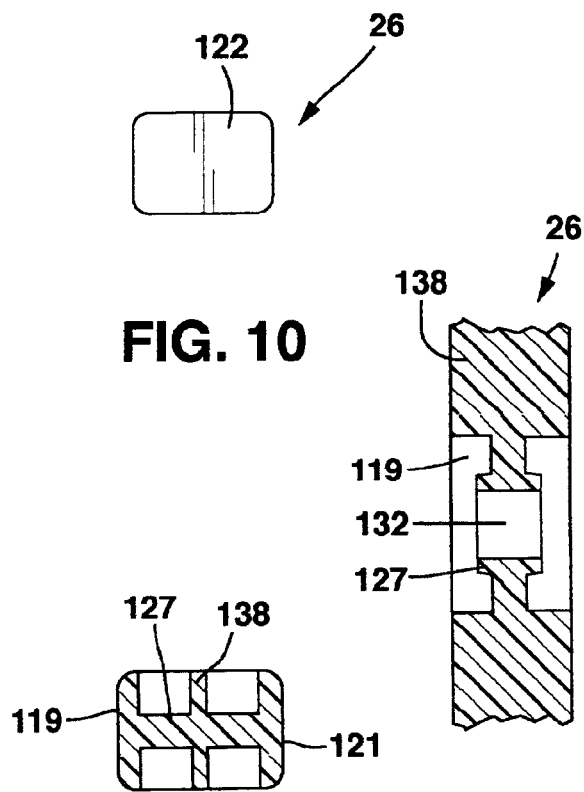
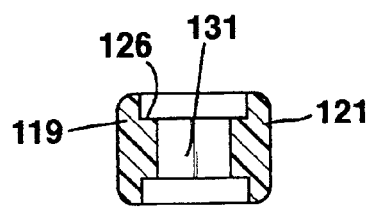
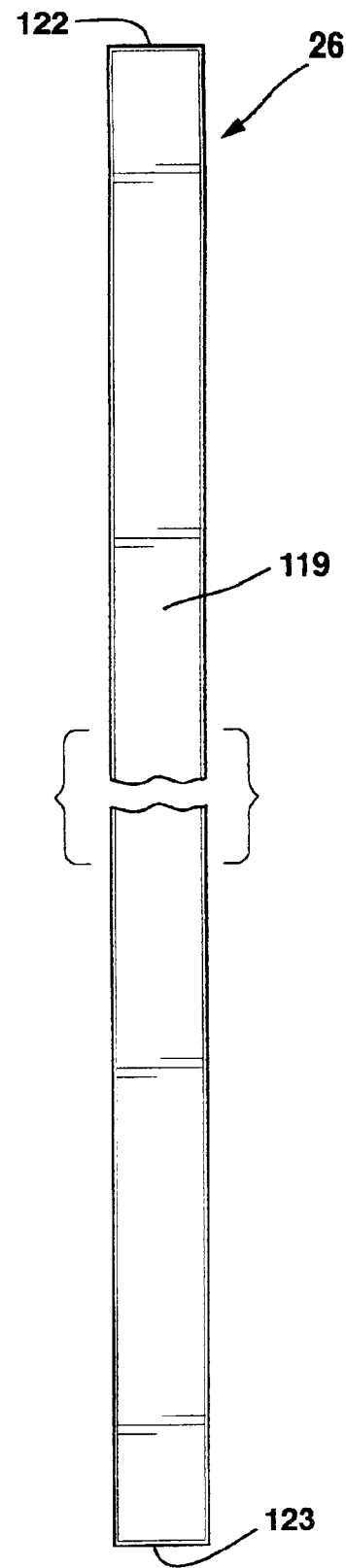

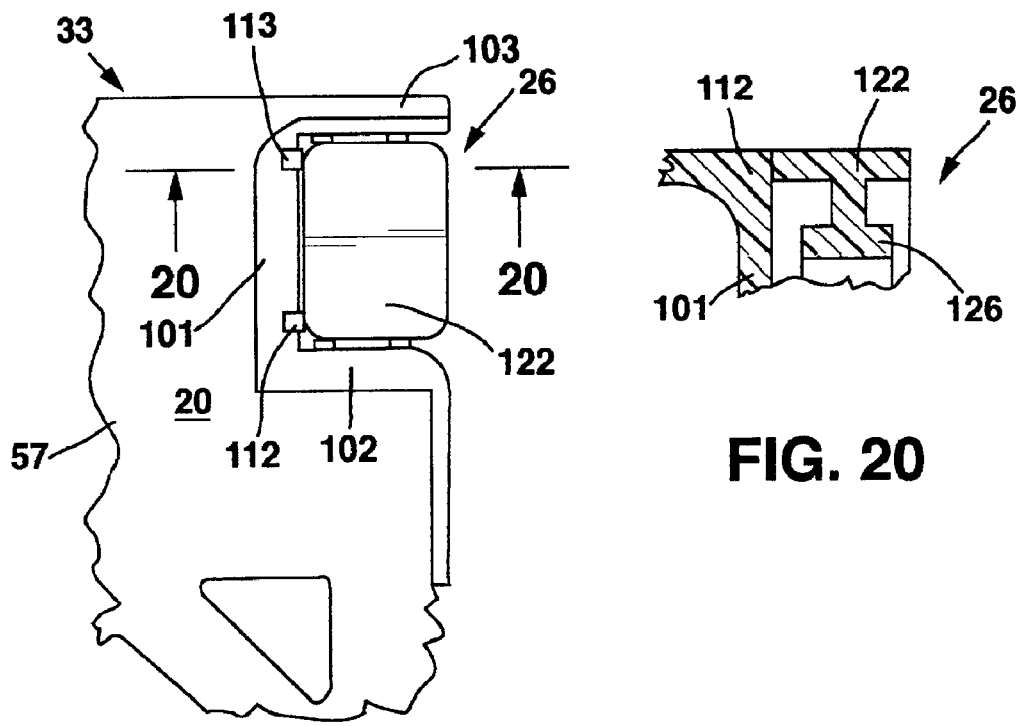
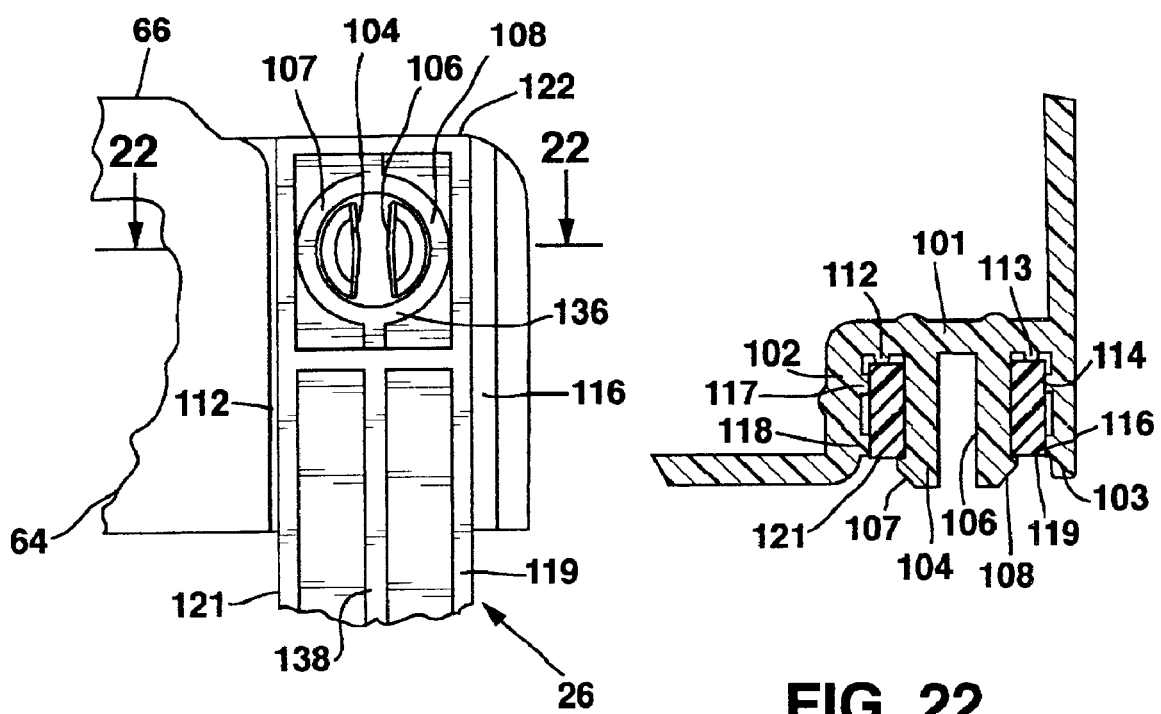

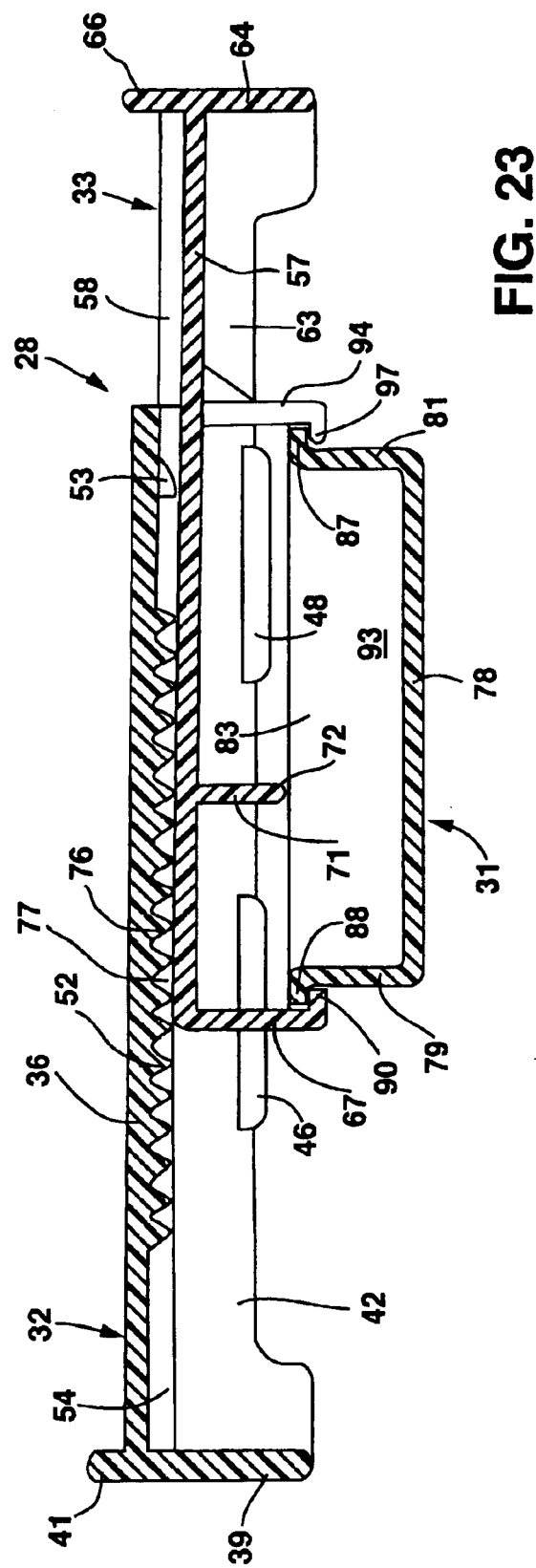
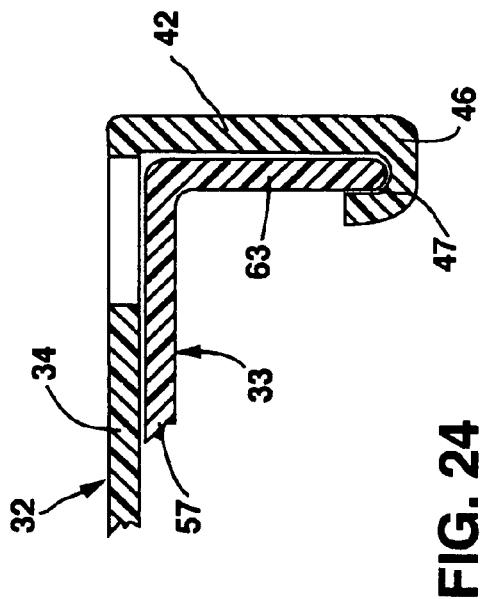
FIG. 23
FIG. 24

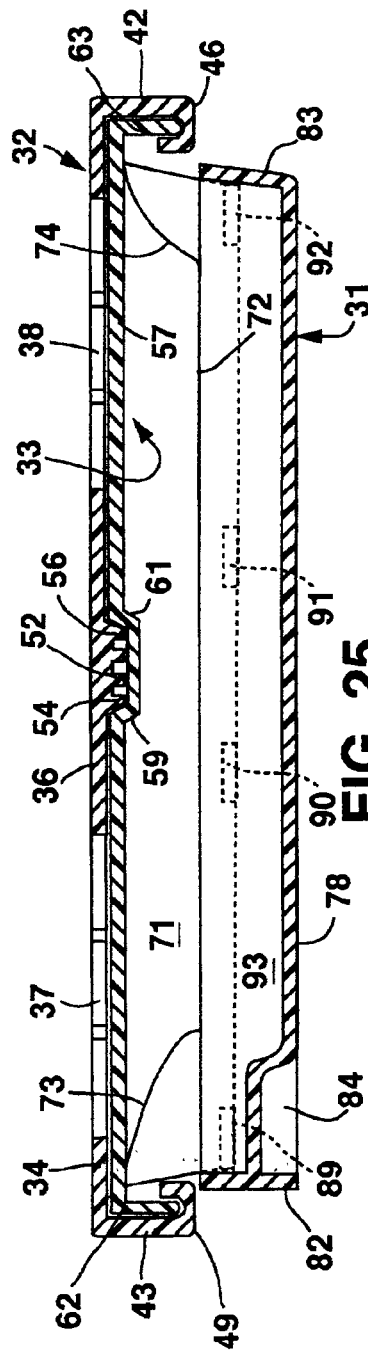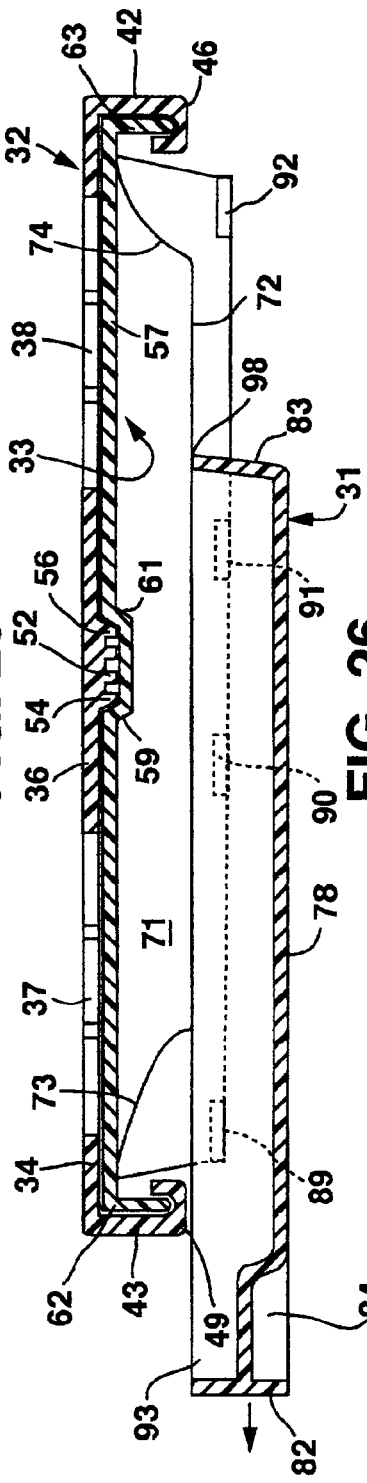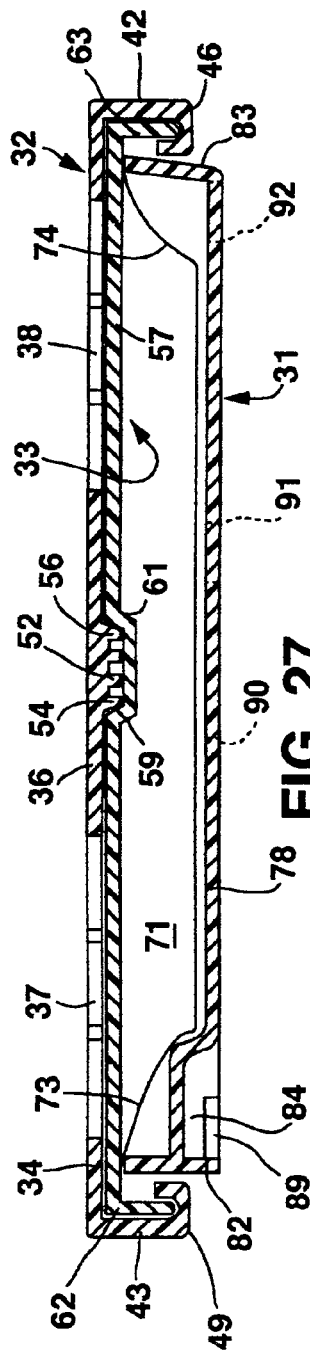

LOCKER SHELF ASSEMBLY WITH SLIDEABLE DRAWER

FIELD OF THE INVENTION

The invention is in the art of shelf assemblies used in cabinets and lockers for supporting objects. More particularly, the shelf assemblies have laterally expandable shelf members mounted on upright legs that support the shelf members in horizontal locations within lockers.

BACKGROUND OF THE INVENTION

Schools, commercial, industrial, and military institutions, work out, sport and golf locker rooms are equipped with single and double tier lockers to provide storage for clothes and other personal items. Conventional lockers have upper shelves for supporting small items and a large lower compartment for accommodating long clothing, such as coats, jackets, shirts and the like. Shelf assemblies supported on the locker floors are used to provide additional shelves for holding objects and organizing objects within the lockers. Shelf assemblies having expandable shelf members are independent shelf units that fit into different sizes of lockers. Examples of cabinet and locker assemblies are shown and described in the following U.S. patents.

W. Denton in U.S. Des. Pat. No. 332,238 discloses a free standing shelf assembly having a frame supporting horizontal shelves adapted to be located within a cabinet. The frame has upright corner members connected to the corners of the horizontal shelves. Each shelf is a one-piece sheet metal member connected to the corner members of the frame.

A. Stone in U.S. Pat. No. 2,360,452 describes a storage cabinet having an interior space accommodating a collapsible shelf unit. The shelf unit is a box with upright flat side walls and open front and rear ends. A one-piece horizontal shelf located within the box is connected with fasteners to the side walls.

W. H. Novales in U.S. Pat. No. 3,360,321 discloses a knockdown locker structure having upright supports for holding horizontal shelves. The shelves have pivotally connected shelf members with end flanges provided with slots. The shelf members are not laterally adjustable to fit in lockers having different widths. Studs with large heads secured to the supports project through the slots to mount the shelves on the supports.

T. A. Burton in U.S. Pat. No. 4,283,099 discloses a cabinet having a drawer assembled within a locker. The cabinet has vertical side walls joined to horizontal shelf panels. Opposite ends of the shelf panels are secured to horizontal brackets attached to the side walls. The drawer is slideable between vertically spaced shelf panels to open and closed positions.

R. R. Peterson in U.S. Pat. No. 4,500,146 discloses a shelf assembly used in a locker to support clothing, books, and tools. The shelf assembly has vertical legs with upright slots. Horizontal shelves are mounted on the legs. Each shelf has a pair of shelf members that are laterally movable relative to each other to adjust the width of the shelf assembly. A separate releasable fastener, shown as a nut and bolt assembly, clamps the shelf members in their adjusted positions to retain the shelf assembly within the locker. The corners of the shelf members have hook connectors that extend through the slots to support the shelf on the legs.

M. E. Massoudnia, M. Snider and D. L. Schwartz in U.S. Pat. No. 5,152,407 disclose a stackable and nestable wire rack having a wire grid platform secured to generally rectangular end frames. A wire basket located below the rack is slidably mounted on horizontal channel runners connected to the bottom of the rack.

G. E. McNamara and Craig N. Hansen in U.S. Pat. No. 5,421,646 disclose a legless locker shelf assembly having laterally moveable shelf members that are expanded into engagement with opposite side walls of a locker to retain the shelf assembly on the locker. The side walls of the shelf members have cooperating ratchet teeth that retain the shelf members in expanded positions. A cam actuator rotatably mounted on one shelf member engages cam follower teeth on the other shelf member whereby rotation of the cam actuator moves the shelf members relative to each other to expand the width of the shelf assembly into firm engagement with the side walls of the locker.

R. M. Kurtis discloses a locker stand having upright legs pivotally connected to a pair of one-piece shelves. The pivotal connections between the legs and shelves allows the stand to fold to a generally flat upright position. The width of the locker stand is not adjustable.

SUMMARY OF THE INVENTION

The shelf assembly of the, invention has horizontal shelves attached to upright legs that support the shelves within the interior chamber of a locker. Each shelf has first and second shelf members having cooperating parts that permit the shelf members to be moved relative to each other to expand the width of the shelf to fit different sized lockers. Separate fasteners, such as nuts and bolts, are not used to retain the shelf members in adjusted positions or attach the legs to the shelf members. The legs have symmetrical sides and end-to-end structures that allow assembly of the legs to the shelf members without regard to any specific position of the legs. The shelf members have corner pockets and connecting fingers that cooperate with the legs to retain the legs in sturdy tight relation with the shelf members. A horizontally movable drawer is slidably mounted on a shelf member for movement between a closed position below the shelf member and an open position in front of the shelf member. The drawer is movable from opposite sides of the shelf member independently of the lateral expanded positions of the first and second shelf members. The shelf has horizontal side lips that rest on ledges connected to the shelf member and a transverse end wall that engages a downwardly directed rib joined to the bottom of the shelf member. The ledges and rib maintain the drawer in a generally horizontal position when the drawer is in the open position. The rib has inwardly spaced opposite ends that permit the drawer to nest under the shelf member to facilitate packaging of the shelf assembly. The unassembled shelf assembly is packaged in a generally rectangular box with the shelves in end-to-end locations and the legs adjacent opposite sides of the shelves. The drawer in the nested position does not increase the packaging dimensions. The flat shelf assembly packaging box provides shipping efficiency and effective marketing display space.

One preferred embodiment of the shelf assembly has upper and lower shelves supported on upright legs useable within the interior chamber of a conventional locker or cabinet. Each shelf has first and second shelf members having adjacent top walls and side walls located in sliding engagement with each other to allow the shelf members to be moved relative to each other to adjust the width of the shelf to fit within the interior chamber of different sized lockers. The second shelf member has downwardly directed end walls and a transverse rib between the end walls that reinforce the shelf. Ratchet teeth and a detent on adjacent top walls cooperate with each other to retain the first and second shelf members in their adjusted positions. An open top drawer located below the second shelf is slidably mounted on supports joined to the top wall of the second shelf. The drawer is movable between open and closed positions independently of the lateral expanded positions of the first and second shelf members. The drawer has a bottom wall joined to upright side walls and front and rear end walls. Horizontal lips on the side walls engage the supports to slidably hold the drawer and allow the drawer to nest within the second shelf member. The rear end wall engages the transverse rib to retain the drawer generally horizontal when the drawer is in the open position. The supports allow the drawer to be assembled on the second shelf member from opposite sides of the second shelf member. When the drawer is in the nested position it does not increase the packaging size of the shelf assembly which is located within a generally flat rectangular box. The box package for the shelf assembly has shipping efficiency and effective use of retail display space. The shelf members have corner pockets for accommodating the upright legs. The legs and corner portions of the shelf members have cooperating connecting structures comprising fingers located in the pockets and sleeves having holes on the legs. The fingers project through the holes and engage the sleeves to retain the legs with a tight fit in the pockets. Upright ribs joined to the corner portions of the shelf members project into the pockets and are in surface compression engagement with the legs to inhibit lateral movement of the legs relative to the shelf members. The shelf members are packaged within a rectangular box by locating the first and second shelf members in end-to-end relationship. The drawer is in the nested position in the second shelf member. The legs are placed adjacent opposite sides of the end-to-end shelf members. The packaged shelf assembly is relatively flat and light weight which is efficiently transported to point of sale locations for retail display.

DESCRIPTION OF THE DRAWINGS

FIG. 10 is a top plan view of FIG. 8;

FIG. 11 is a foreshortened side elevational view of FIG. 8;

FIG. 12 is a sectional view taken along the line 12—12 of FIG. 9;

FIG. 13 is a sectional view taken along the line 13—13 of FIG. 9;

FIG. 14 is a sectional view taken along the line 14—14 of FIG. 9;

FIG. 19 is an enlarged top plan view of a corner portion of one member of the shelf assembly connected to a shelf leg;

FIG. 20 is a sectional view taken along the line 20—20 of FIG. 19;

FIG. 21 is a side elevational view of the right side of FIG. 19;

FIG. 22 is a sectional view taken along the line 22—22 of FIG. 21;

FIG. 23 is an enlarged sectional view taken along the line 23—23 of FIG. 6;

FIG. 24 is an enlarged sectional view taken along the line 24—24 of FIG. 6;

FIG. 25 is an enlarged sectional view taken along the line 25—25 of FIG. 6;

FIG. 26 is the sectional view of FIG. 25 showing the drawer in an open position;

FIG. 27 is the sectional view of FIG. 25 showing the drawer in the packaged nested position;

DESCRIPTION OF PREFERRED EMBODIMENT

Figure 1:
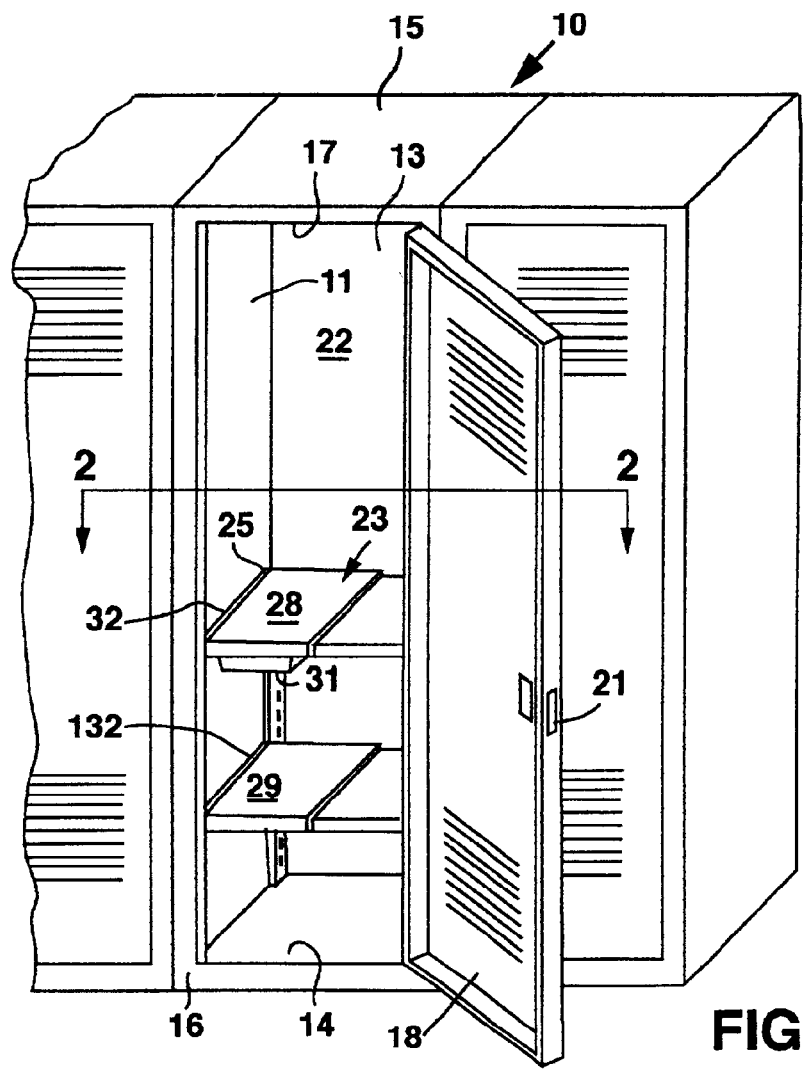
FIG. 1 is a perspective view of a locker accommodating a locker shelf assembly with a slideable drawer of the invention.
Figure 2:
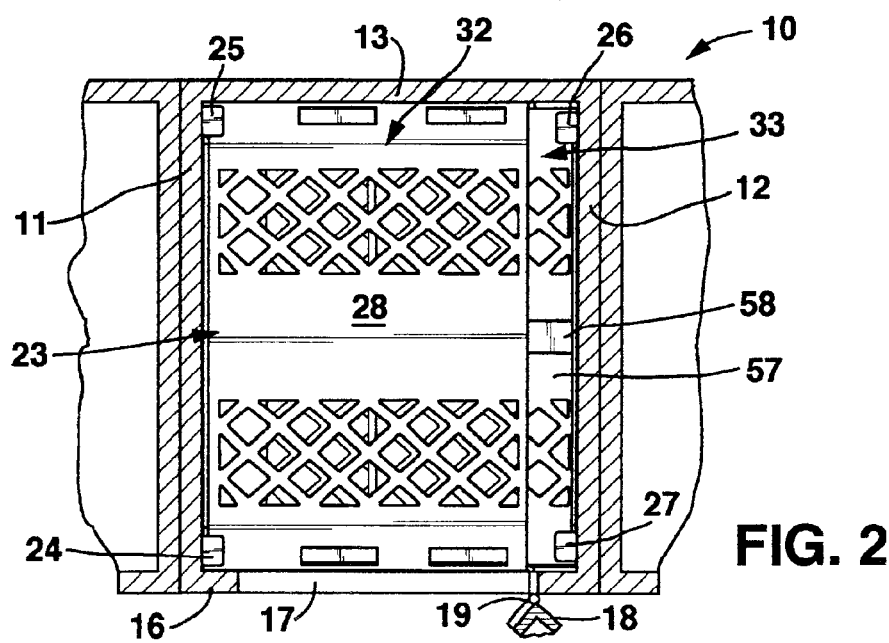
FIG. 2 is an enlarged sectional view taken along the line 2—2 of FIG. 1.

Conventional storage lockers 10, shown in FIGS. 1 and 2, are used in education, commercial, industrial, and military institutions and sports, health clubs and golf facilities to temporarily store personal items, such as tools, clothing, boots, and books. Each locker has a housing having upright flat side walls 11 and 12 joined to an upright flat back wall 13, a horizontal bottom wall 14 and a horizontal top wall 15. A rectangular door frame 16 joined to the front of walls 11 to 15 has a front doorway 17 open to the storage area or interior chamber 22 of the locker. As seen in FIG. 2, door frame 16 has upright side flanges that project toward each other and surround doorway 17. The width of doorway 17 is smaller than the width of interior chamber 22 of the housing. A rectangular door 18 pivotally mounted on door frame 16 with a plurality of hinges 19 is manually moved between open and closed positions relative to doorway 17. A releasable latch 21 on the free side of door 18 cooperates with door frame 16 to retain door 18 in the closed position.

A locker shelf assembly, indicated generally at 23, is located in chamber 22 behind door frame 16. The inwardly directed flanges of door frame 16 retain locker shelf assembly 23 within chamber 22. Locker shelf assembly 23 has upper and lower two-piece shelves or platforms 28 and 29 mounted on upright shelf legs or posts 24, 25, 26 and 27 which horizontally support shelves 28 and 29 in the lower section of chamber 22. The lower ends of legs 24 to 27 rest on corner portions of bottom wall 14. The locker shelf assembly 23 can have more than two shelves or a single shelf.

The upper and lower shelves 28 and 29 are identical in construction. Upper shelf 28 has a slidable drawer 31 manually movable between closed or in and open or out positions for accommodating objects. The lower shelf 29 can accommodate a second drawer. The following description is directed to upper shelf 28. Corresponding parts of lower shelf 29 have the same reference numbers as upper shelf 28 with the prefix 1.

Figure 7:
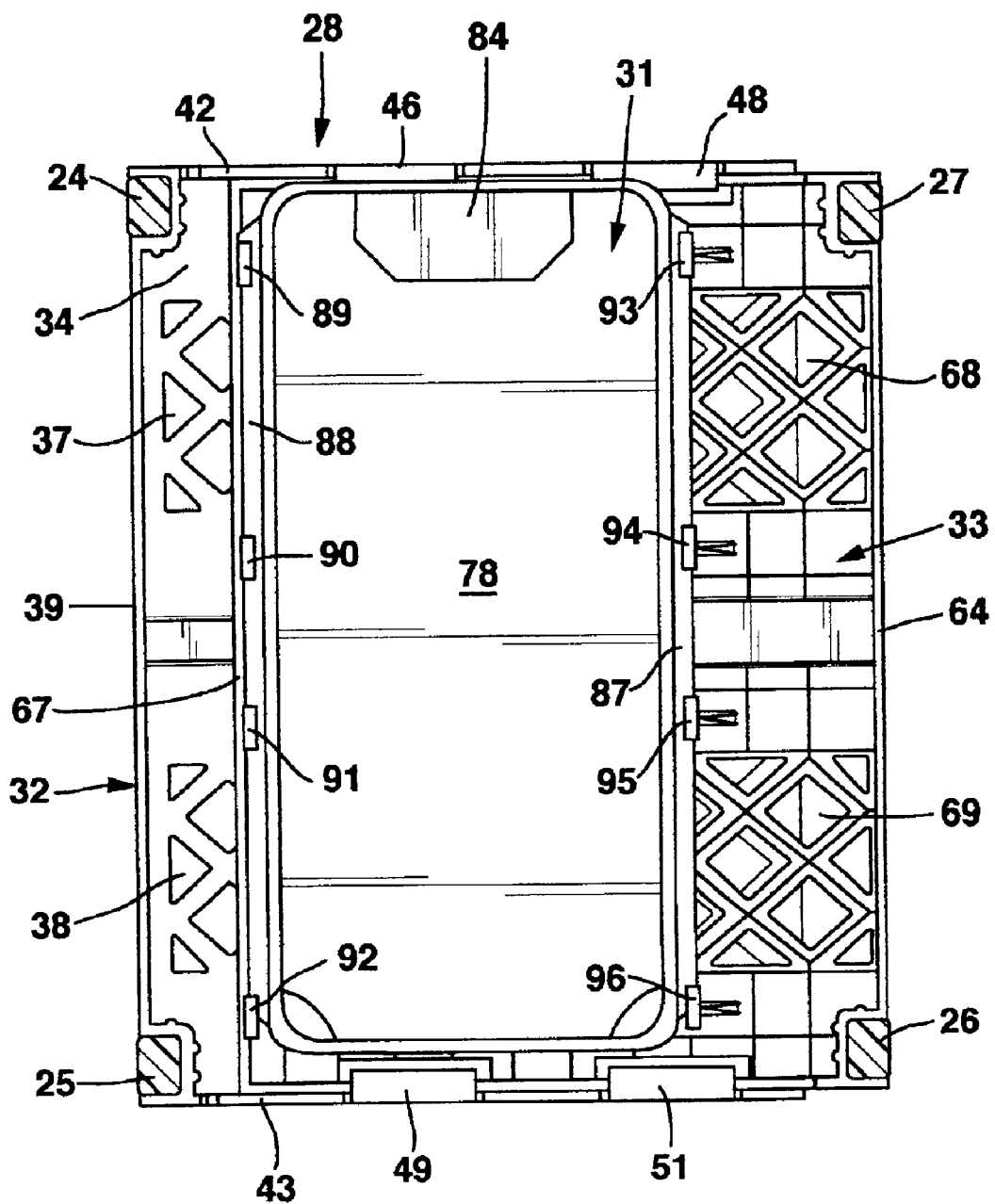
FIG. 7 is an enlarged sectional view taken along the line 7—7 of FIG. 5.
Figure 8:
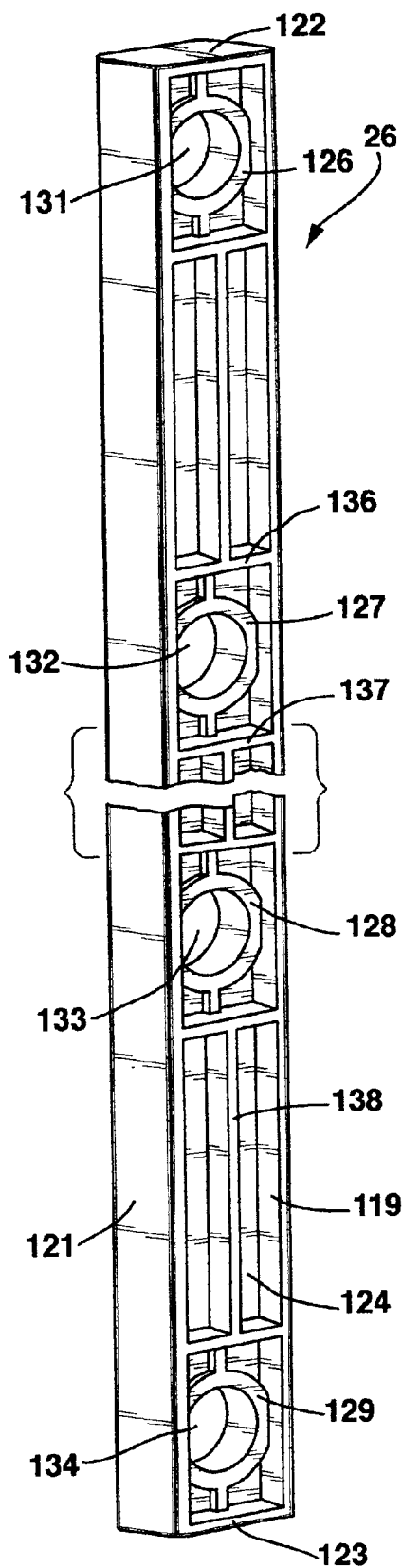
FIG. 8 is a foreshortened perspective view of a shelf leg of the locker shelf assembly of FIG. 3.
Figure 9:
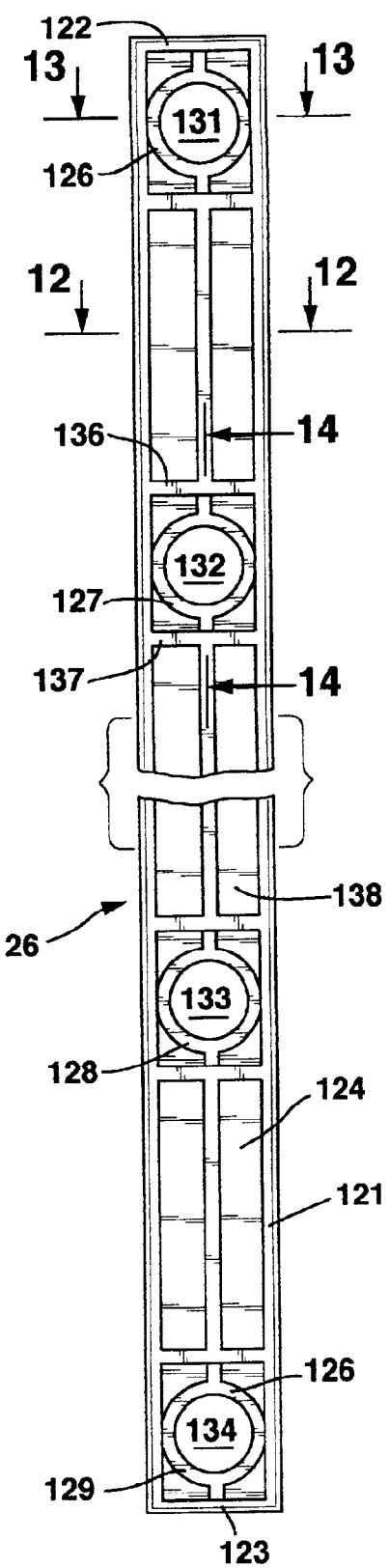
FIG. 9 is a foreshortened front elevational view of FIG. 8.
Figure 15:
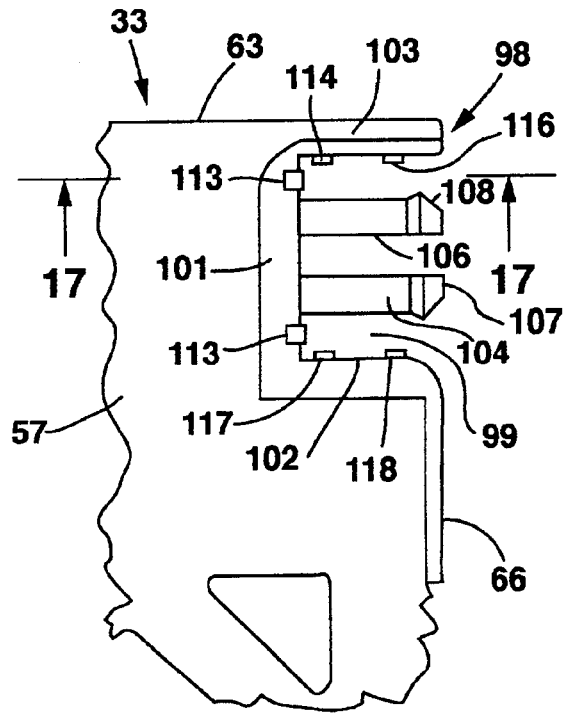
FIG. 15 is an enlarged top plan view of a corner portion of one member of the shelf assembly without a shelf leg.

Shelf assembly 28 has first and second shelf members 32 and 33 slidably connected together for adjusting the width of shelf assembly 28 and retaining the adjusted width of shelf assembly 28 within chamber 22 of locker 10. Shelf member 32 has a flat top wall 34 having a center section 36 and two square hole patterns 37 and 38 to reduce the weight of shelf member 32 and enhance its appearance. Hole patterns 37 and 38 are adjacent opposite sides of center section 36 and extend between opposite sides of shelf member 32. The outside edge of wall 34 is joined to an upright flange 39 having a continuous lip 41 extended above the top horizontal plane of top wall 34. As shown in FIG. 7, linear lateral flanges 42 and 43 joined to the front and back sides of top wall 34 extend downwardly along the width of top wall 34. Flanges 39, 42 and 43 provide top wall 34 with the structural strength to inhibit bending and warping of top wall 34. As shown in FIGS. 7 and 23 to 27, the lower edges of flanges 42 and 43 have inwardly and upwardly turned bosses 46, 48, 49 and 51 having upwardly open channels 47 to slidable accommodate second shelf member 33. A linear row of downwardly directed triangular teeth 52 extend along the bottom of the center section 36 of top wall 34. A stop projection 53 joined to wall 36 is spaced adjacent the outer end of teeth 52. Teeth 52 and stop projection 53 are located between downwardly directed linear guide ribs 54 and 56 joined to the bottom of center section 36 of top wall 34. Ribs 54 and 56 provide center section 36 with additional structural strength to inhibit bending and warping of top wall 34 and provide linear guides to confine relative movement to first and second shelf members 32 and 33 to relative linear movement.

Second shelf member 33 has a flat top wall 57 partly located under top wall 34. The center section of wall 57 has a linear channel 58. Top wall 57, as seen in FIGS. 25 to 27, has downwardly directed linear side walls 59 and 61 located in sliding engagement with guide ribs 54 and 56. Ribs 54 and 56 cooperate with side walls 59 and 61 to linearly guide shelf members 32 and 33 when shelf assembly 28 is expanded in locker chamber 22. Top wall 57 is joined to downwardly directed linear side walls or flanges 62 and 63. As shown in FIGS. 24 to 27, flanges 62 and 63 have lower portions located in the channels of bosses 46, 48, 49 and 51 to slidably hold shelf members 32 and 33 in assembled relation with top wall 57 of lower shelf 33 in engagement with the bottom surface of top wall 34 of upper shelf member 32. As shown in FIG. 23, lower shelf member 33 has a generally upright end wall 64 with a transverse linear lip 66 projected above the horizontal plane of top wall 57. End wall 64 and lip 66 increases the lateral strength and rigidity of lower shelf member 33. Lip 66 also functions as a linear stop to prevent small objects from moving off the outer end of shelf member 33. The inner end of shelf member 33 has a transverse end wall 67 joined to top wall 57 and side walls 59 and 61. Patterns of rectangular holes 68 and 69 in top wall 57 on opposite sides of channel 58 extend between end walls 64 and 67. Holes 68 and 69 reduce the amount of plastic material and weight of lower shelf member 33. A linear downwardly directed flat rib 71 joined to top wall 57 is located laterally inward from end wall 67. As shown in FIGS. 25 to 27, rib 71 has a linear bottom edge 72 and upwardly inclined ends 73 and 74. Ends 73 and 74 are spaced from flanges 62 and 63 to allow tray 31 to nest in lower shelf member 33 as shown in FIG. 27. Returning to FIG. 23, top wall 57 has detents or upwardly projected triangular members 76 that engage a pair of adjacent teeth 52 to retain upper and lower shelf members 32 and 33 in adjusted expanded positions. Detents 76 ratchet over teeth 52 during expansion of shelf assembly 28. A stop projection 77 on top wall 57 located rearwardly of and aligned with detent 76 limits the expanded positions of shelf members 32 and 33. Stop 53 contacts projection 77 to inhibit separation of shelf members 32 and 33.

Drawer 31 is a pan-shaped tray having a flat bottom-wall 78 joined to upright side walls 79 and 81 and end walls 82 and 83. Bottom wall 78 adjacent end wall 82 has an upward pocket or recess 84 providing a space for a person's fingers to facilitate manual movement of drawer, as shown by arrow 86 in FIG. 26. Returning to FIG. 7 and 23, horizontal lips 87 and 88 joined to the top edges of side walls 79 and 81 extend outwardly from side walls 79 and 81. Lips 87 and 88 are flat continuous flanges that extend substantially the entire length of side walls 79 and 81. The opposite ends of lips 87 and 88 are inwardly inclined to facilitate the insertion of drawer 31 in sliding supporting position on shelf 33. Drawer 31 is a one-piece plastic tray having a chamber 93 for holding objects, such as pens, pencils and small personal items. Drawer 31 can have different shapes and sizes to accommodate different objects including auto tapes, computer diskettes and CD disks.

Drawer 31 is supported on ledges 89, 90, 91 and 92 joined to end wall 67, shown in FIG. 7, and support members 93, 94, 95 and 96. As shown in FIG. 23, support member 94 extends downwardly from top wall 59 and terminates in an inwardly directed ledge 97. Support members 93, 95 and 96 have the same structure as support member 94. Lip 87 of drawer 31 slideably engages the top surfaces of ledges 89 to 91. Lip 88 or drawer 31 slideably engages the top of surfaces of ledges 97 on support members 97. This allows drawer 31 to be moved selectively into and out of either the front and back of lower shelf member 33. Front to back orientation of shelf assembly 28 is not critical to the placing of drawer 31 on lower shelf member 33. Drawer 31 is movable between open and closed positions independently of the lateral expanded positions of the shelf members 32 and 33. As shown in FIGS. 23 and 26, the horizontal plane of the bottom horizontal edge 72 of rib 71 is above the horizontal plane of the top surfaces of ledges 89 to 92 and 97. The top edge 98 of end wall 83 of drawer 31 rides on edge 72 to maintain drawer 31 in a generally horizontal position when it is moved to an out location. The vertical space between edge 72 and the top surfaces of ledges 89 to 92 and 97 is slightly greater than the thickness of lips 87 and 88 to allow drawer 31 to be easily moved between horizontal closed and open positions.

Figure 3:
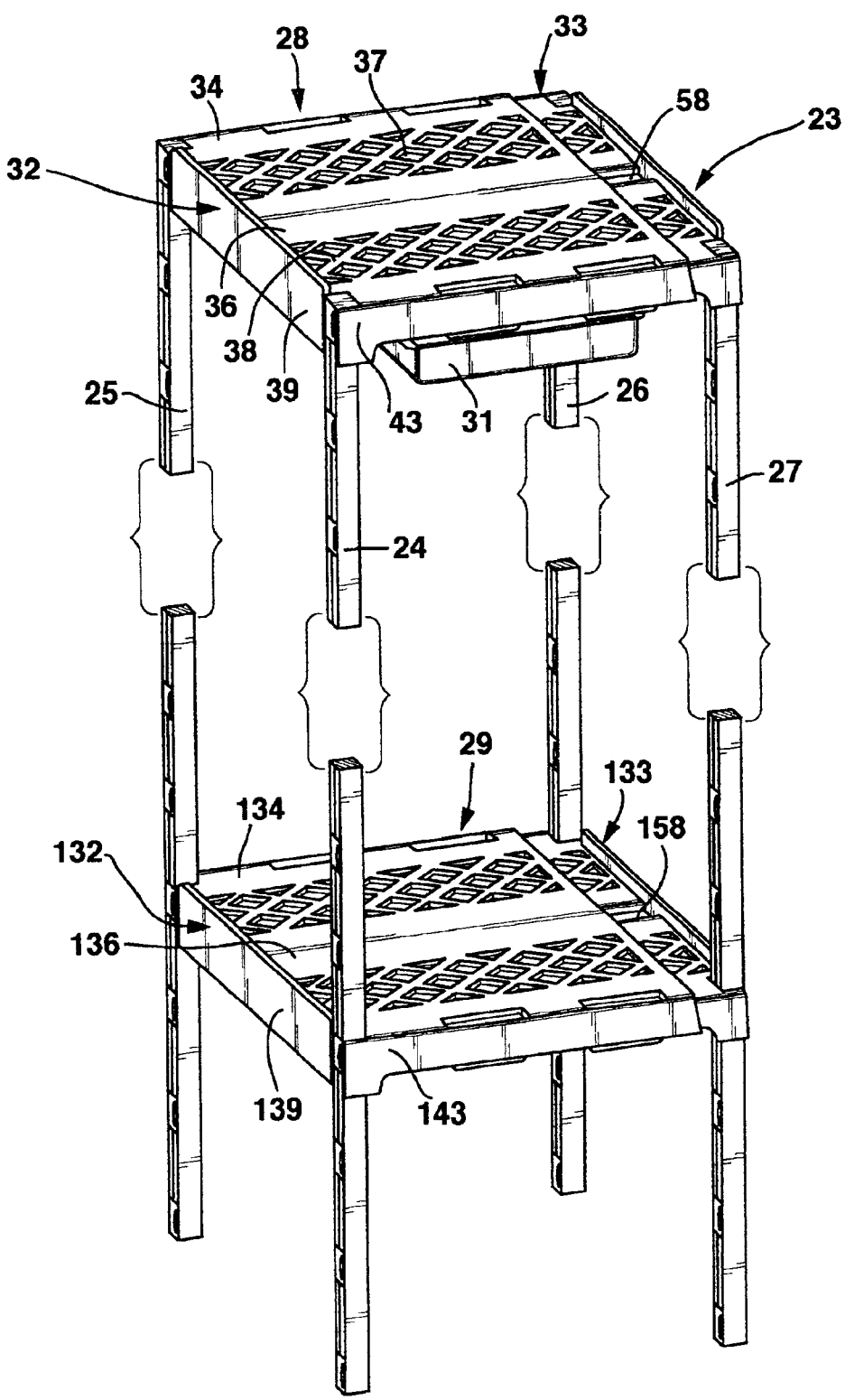
FIG. 3 is a perspective view of the locker shelf assembly with a slideable drawer of the invention.
Figure 6:
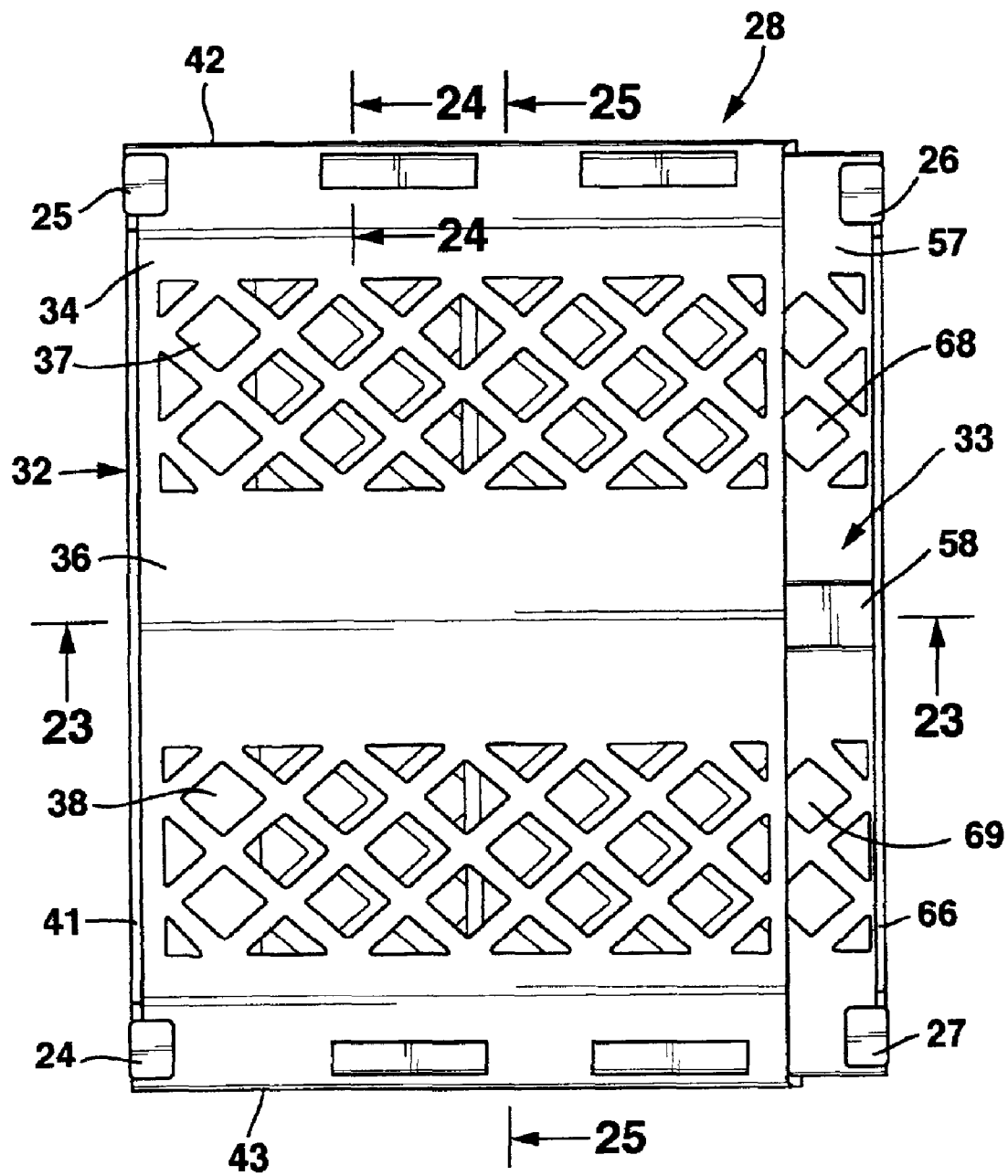
FIG. 6 is a top plan view of FIG. 3.
Figure 16:
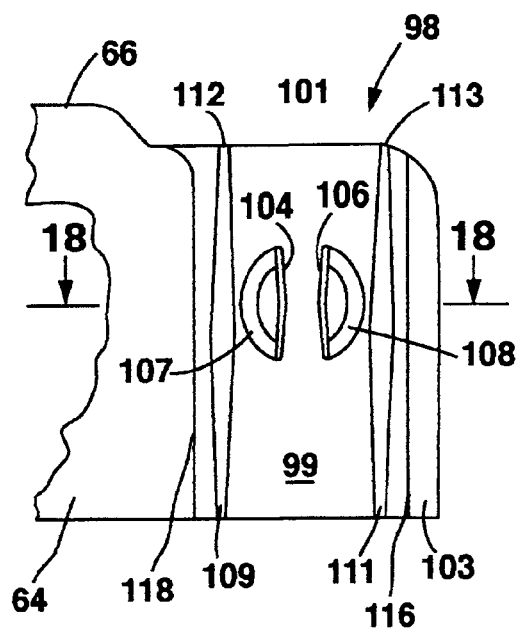
FIG. 16 is a side elevational view of FIG. 15.
Figure 17:
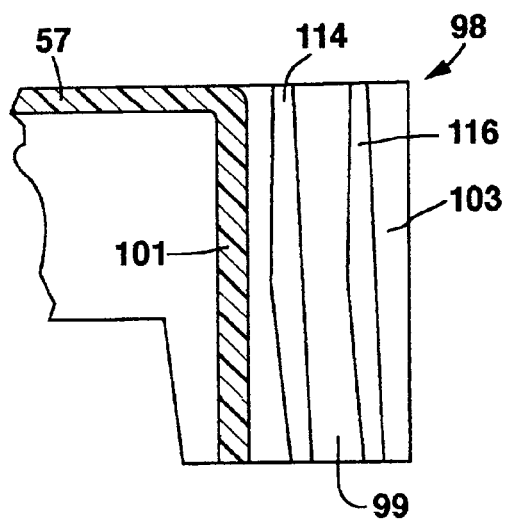
FIG. 17 is a sectional view taken along the line 17—17 of FIG. 15.
Figure 18:
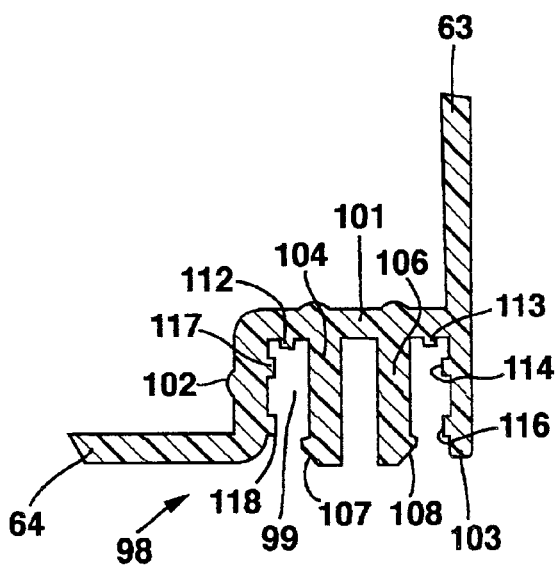
FIG. 18 is a sectional view taken along the line 18—18 of FIG. 16.

As shown in FIGS. 3, 6 and 7, shelves 28 and 29 are retained in vertically spaced orientation with upright legs 24 to 27. Legs 24 and 25 are attached to the outside corners of shelf member 32. Legs 26 and 27 are attached to the outside corners of shelf member 33. The vertical positions of shelves 28 and 29 can be changed along the length of legs 24 to 27. A single shelf or more than two shelves can be attached to legs 24 to 27. The corner sections of shelf members 32 and 33 have the same leg connection structures. FIGS. 15 to 18 show the leg connection structure 98 in the right corner section of shelf member 33. The corner section of top wall 57 has an upright pocket or recess 99 provided by an upright back wall 101, an inside wall 102 and an outside wall 103. A pair of spaced fingers 104 and 106 joined to back wall 101 project outwardly from back wall 101 into pocket 99. Each finger 104 and 106 has a semi-cylindrical or arcuate outer surface. Outwardly directed arcuate heads 107 and 108 are on the outer ends of fingers 104 and 106. As shown in FIG. 16, back wall 101 has a pair of upright back ribs 109 and 111 extended into pocket 99 in the spaces between wall 102 and finger 104 and wall 103 and finger 106. Ribs 109 and 111 have flat upright outer surfaces or faces and upper ends 112 and 113. Outside wall 103, as seen in FIG. 17, has a pair of upright ribs 114 and 116 extended into pocket 99. Ribs 114 and 116 each have vertically elongated diamond shapes. Ribs 114 and 116 have flat upright outer surfaces or faces. Inside wall 102 has a pair of upright ribs 117 and 118 extended into pocket 99. Ribs 117 and 118 have flat upright outer surfaces or faces and the same vertically elongated diamond shape as ribs 114 and 116 shown in FIG. 17. Leg 26 when located in pocket 99 has a tight fit against ribs 109, 111, 114, 116, 117 and 118 to provide leg 26 with lateral stability and prohibit lateral movement of leg in x and y directions relative to shelf member 33.

Figure 4:
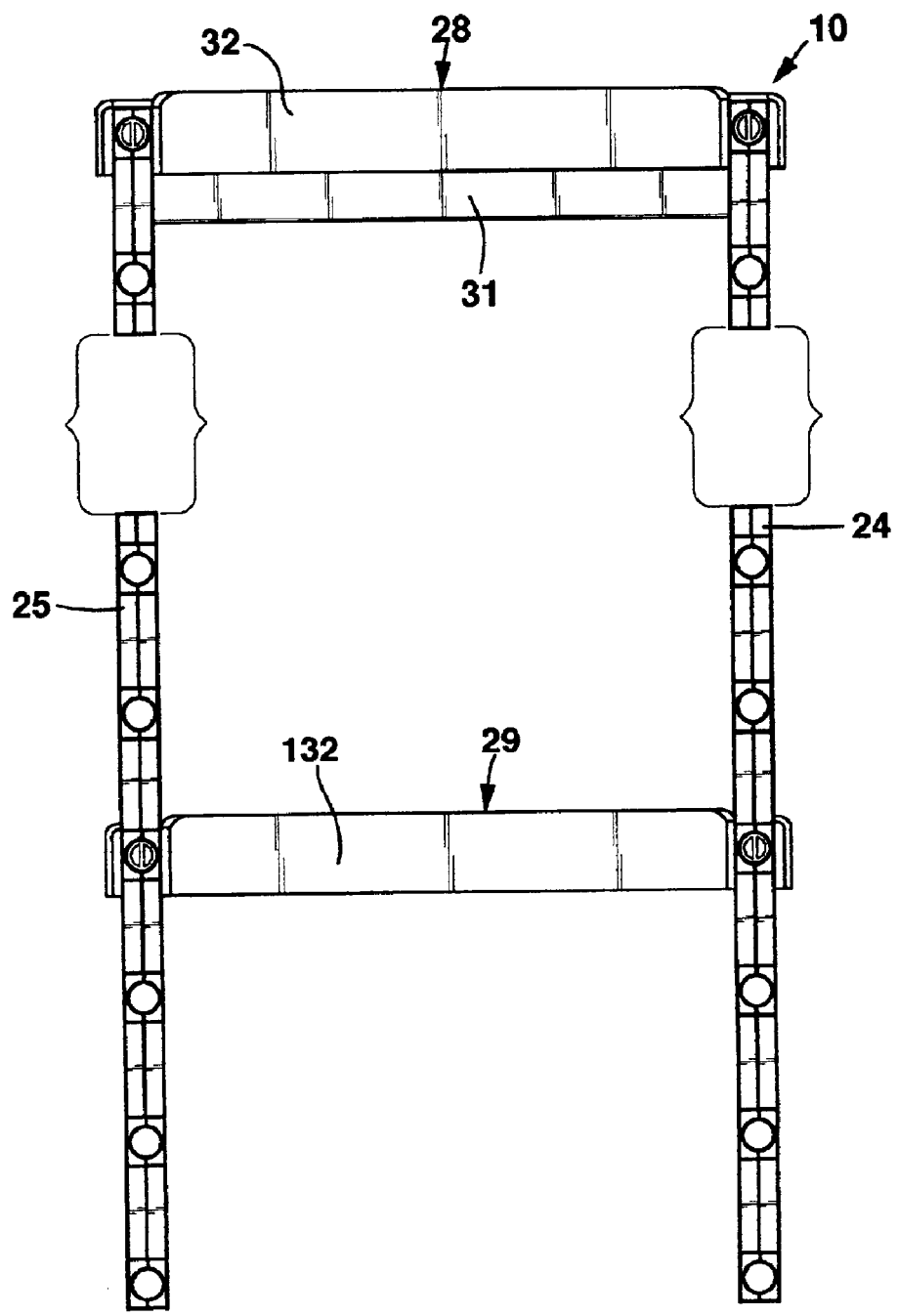
FIG. 4 is a foreshortened side elevational view of FIG. 3.
Figure 5:
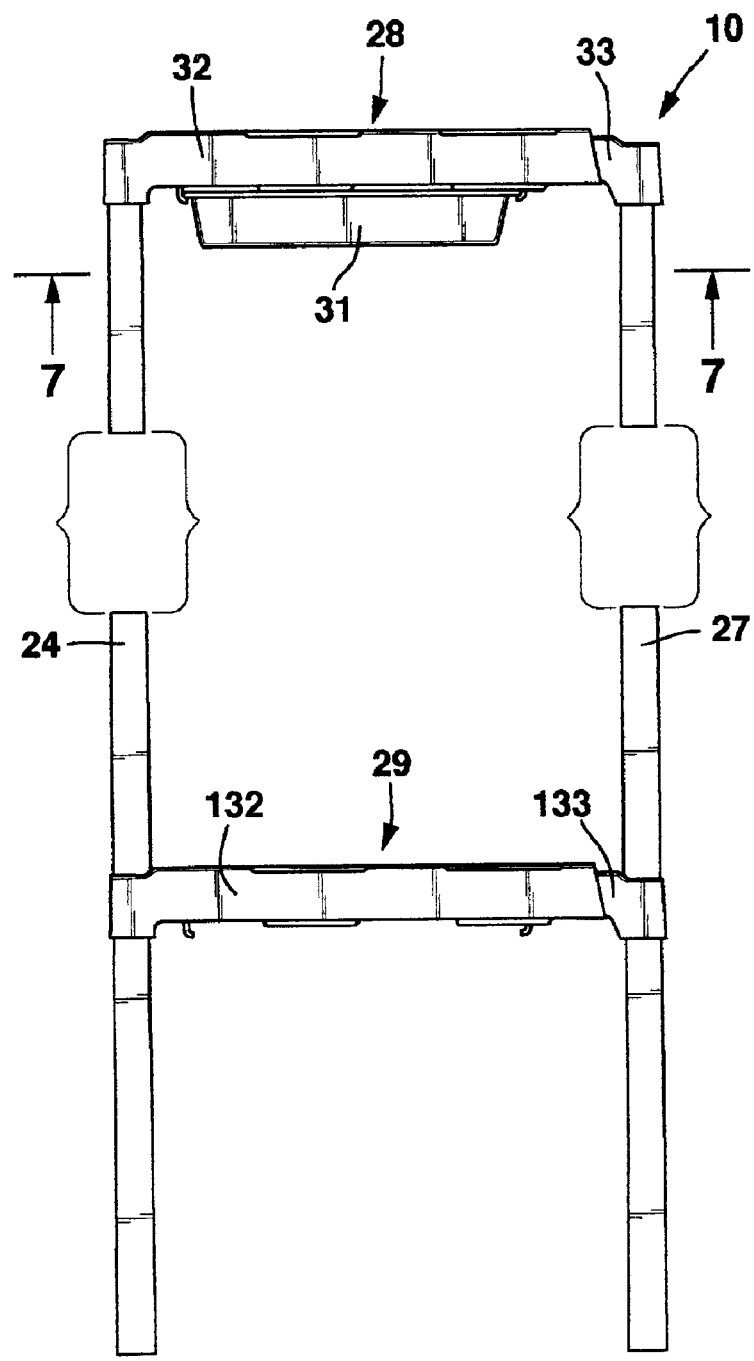
FIG. 5 is a foreshortened front elevational view of FIG. 3.

As shown in FIGS. 9 to 14, leg 26 has identical opposite sides and end to end configurations whereby leg 26 can be attached to shelf members 32 and 33 from either side of leg 26 without reference to the upright position of leg 26. A specific position of leg is not required to secure leg 26 to shelf members 32 and 33. Legs 24 to 27 are identical one-piece plastic members. The following description is directed to leg 26. Leg 26 has upright flat side walls 119 and 121 joined to flat top and bottom walls 122 and 123. A central flat web 124 is located between and joined to walls 119, 121, 122 and 123. A plurality of sleeves or cylindrical members 126, 127, 128 and 129 joined to side walls 119 and 121 and web 127 and extended outwardly from opposite sides of web 127 have transverse cylindrical holes 131, 132, 133 and 134 adapted to accommodate fingers 104 and 106. The opposite ends of sleeves 126 to 129 have flat circular surfaces or faces adapted to engage heads 107 and 108 of fingers 104 and 106 to lock leg 26 on shelf member 33. Sleeves 126 to 129 are longitudinally spaced along the length of leg 29. The number of sleeves and the spaces between adjacent sleeves can vary. Leg 24, shown in FIGS. 3 and 4, has transverse sleeves located along the length of the leg. The inside cylindrical surfaces of sleeves 126 to 129 conform to the curvature of the outer surfaces of fingers 104 and 106 and are in surface engagement with fingers 104 and 106 when leg 26 is attached to shelf member 33. Each sleeve 126 to 129 is located between transverse ribs 136 and 137 joined to web 124 and side walls 119 and 121. Longitudinal ribs 138 extended between transverse ribs 136 and 137 are joined to web 124 and extend outwardly from opposite sides of web 124, as shown in FIG. 12. Web 124 and ribs 136, 137 and 138 reinforce sleeves 126 to 129 and provide leg 26 with structural strength.

As shown in FIGS. 19 to 22, leg 26 attached to shelf member 33 is located in pocket 99 and retained therein with fingers 104 and 106. The opposite outside surfaces of side walls 119 and 121 of leg 26 are located in tight fit or compression surface engagement with ribs 114, 116, 117 and 118. Fingers 104 and 106 are biased outwardly in opposite directions to retain the arcuate outer surfaces of the fingers in firm surface engagement with sleeve 126. The heads 107 and 108 of fingers 104 and 106 extend over side walls 119 and 121 of leg 26 to retain leg 26 in pocket 99 and hold side walls 119 and 121 in firm surface engagement with back ribs 112 and 113. As shown in FIGS. 19 and 20, the transverse wall 122 of leg 26 engages the upper ends 112 and 113 to laterally stabilize leg 26. Leg 26 is firmly retained on shelf member 33 due to the tight fit of the walls of leg 26 with ribs 112, 113, 114, 116, 117 and 118 and the surface fit of fingers 104 and 106 with sleeve 126. Leg 27 is interlocked with shelf member 33 with rib and finger structure that is the same as disclosed in FIGS. 15 to 22. Legs 24 and 25 are interlocked with shelf member 32 with rib and finger structures that are the same as disclosed in FIGS. 15 to 22. The identical leg interlocking structures of shelf members 32 and 33 allows for identical legs to be attached to either shelf member. The symmetrical parts of leg 26 allows the leg to be connected to shelf member 33 independent of the side and end orientation of the leg.

Locker shelf assembly 23 is packaged in a generally flat knock down arrangement of shelf members, drawer and legs which fit in a flat rectangular container or box 138, shown in broken lines in FIGS. 29 to 33. Flat box 138 has large surface areas for accommodating product identification and trademarks. A number of flat boxes 138 can be displayed at point of purchase side-by-side in a minimum of retail display space. Flat box 138 also allows for convenient and economical shipping of locker shelf assembly 23.

Figure 28:
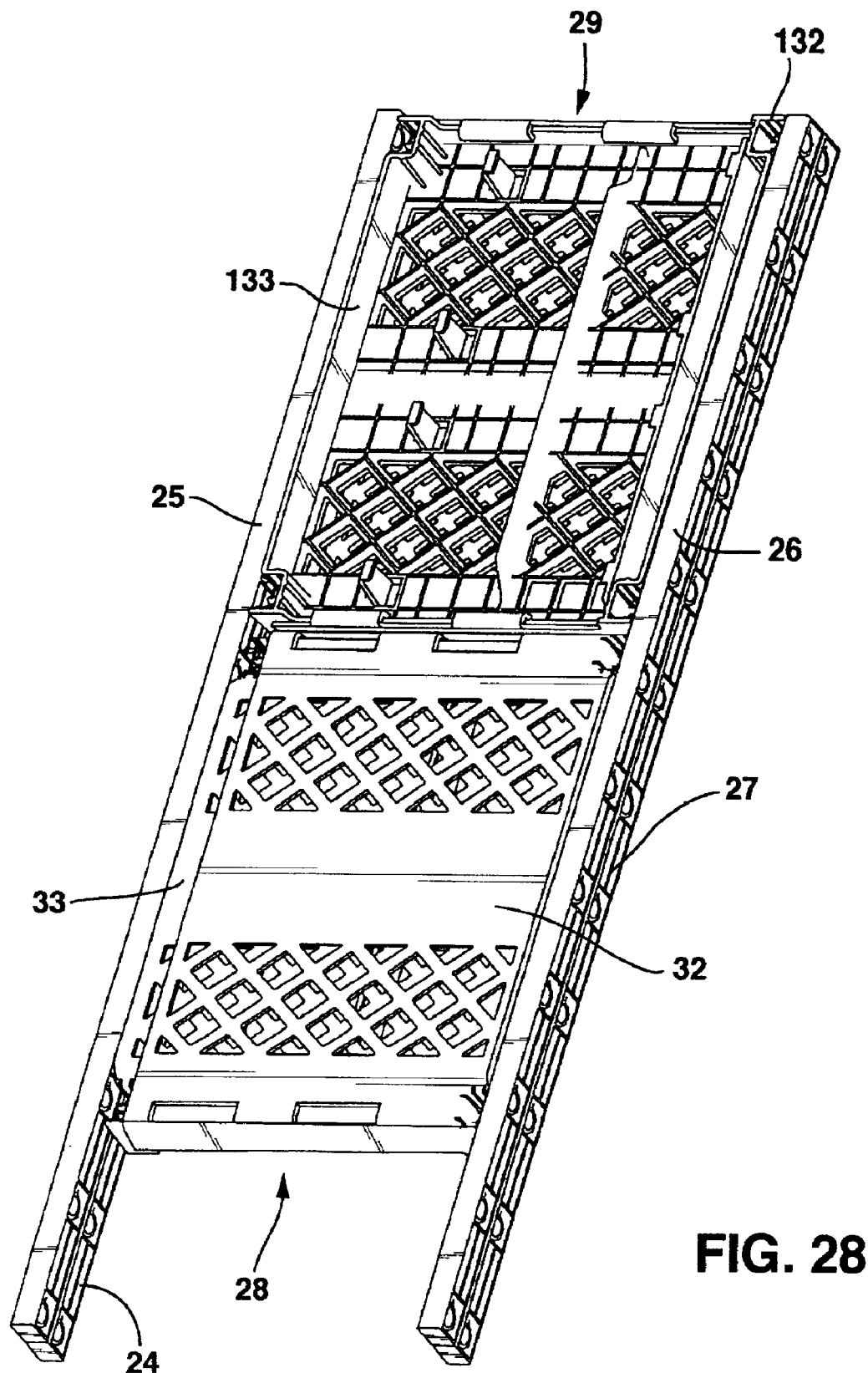
FIG. 28 is a perspective view of the locker shelf assembly with a slideable drawer in the flat, knock-down packaged nested position.
Figures 29, 30:
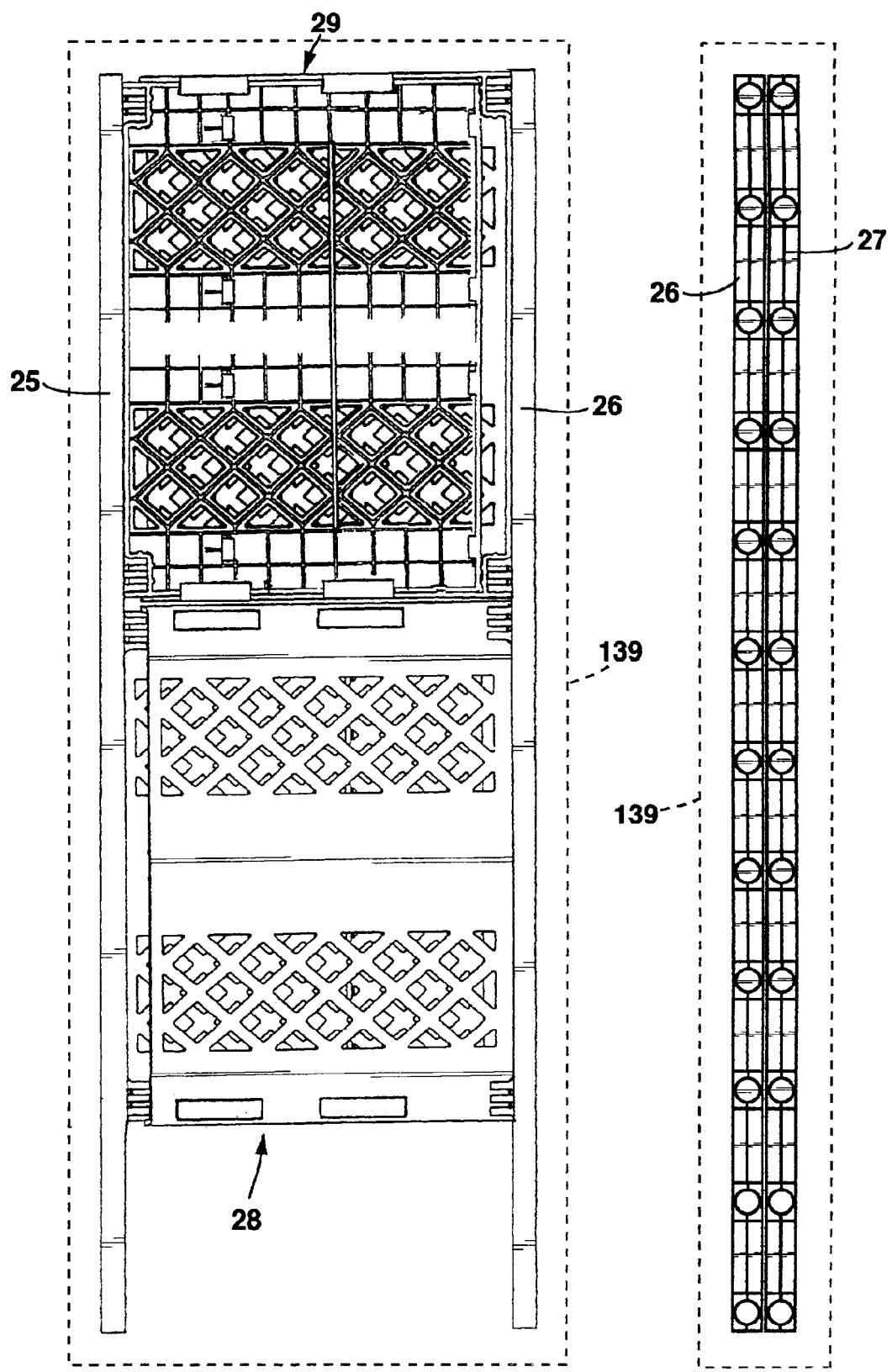
FIG. 29 is a front elevational view of FIG. 28 showing the package in broken lines.
FIG. 30 is a side elevational view of FIG. 29.
Figure 31:
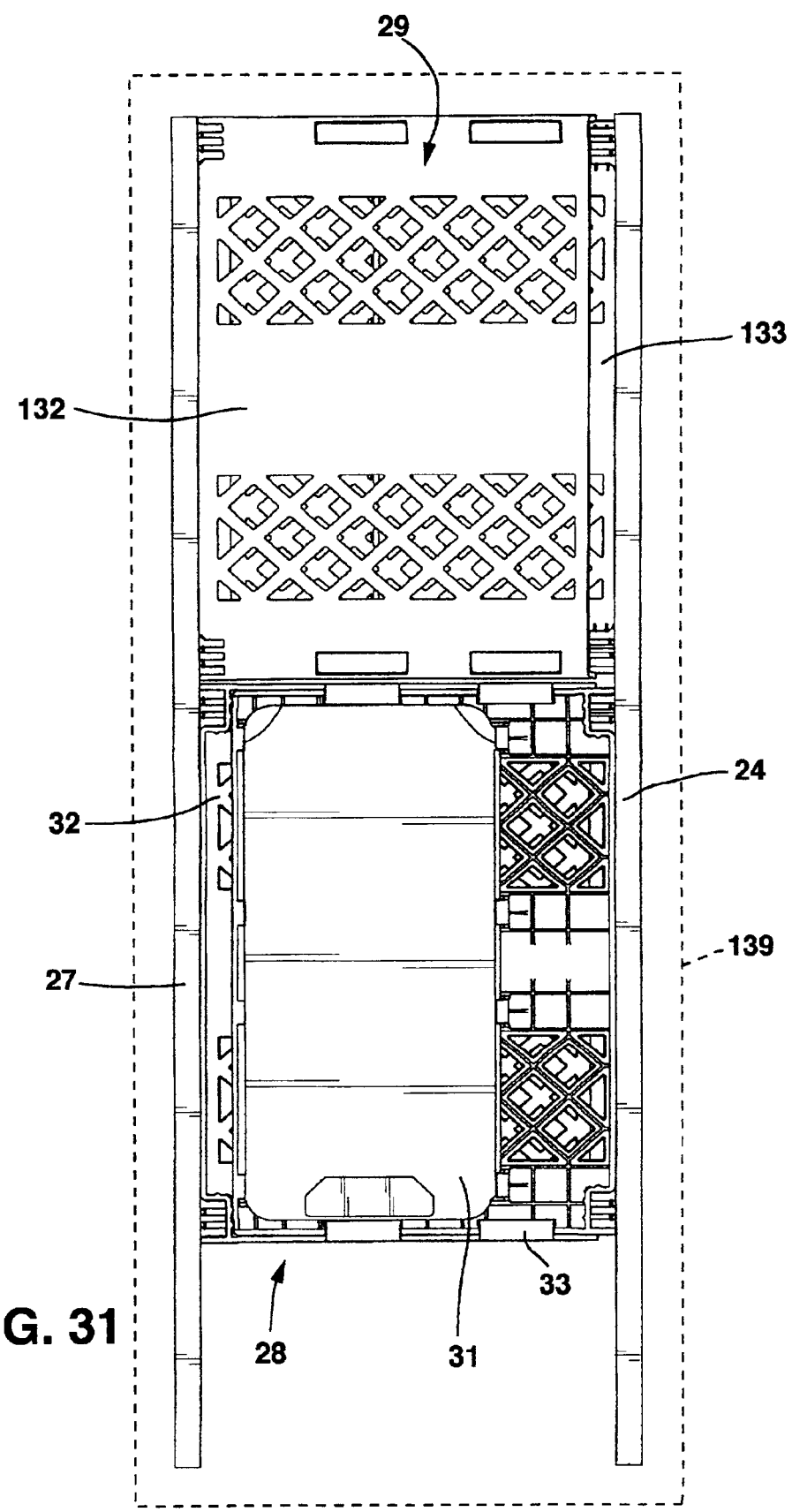
FIG. 31 is a rear elevational view of FIG. 28 showing the package in broken lines.
Figure 32:
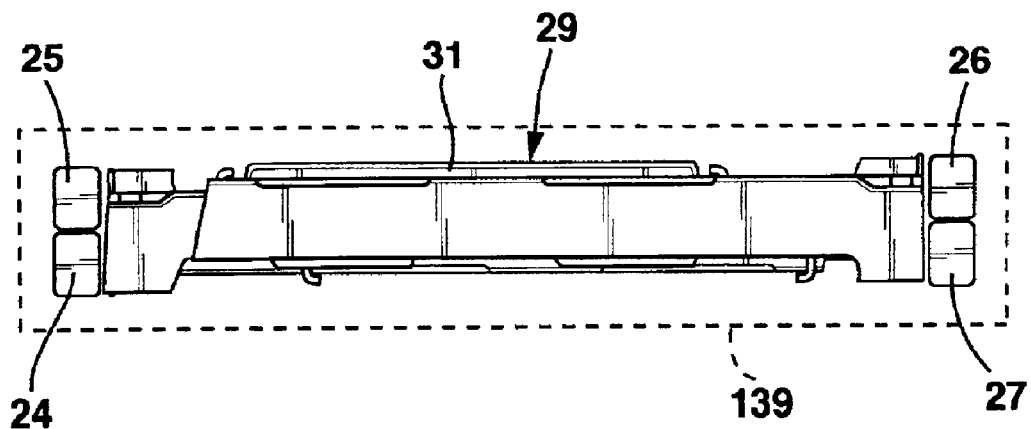
FIG. 32 is a top plan view of FIG. 29.
Figure 33:
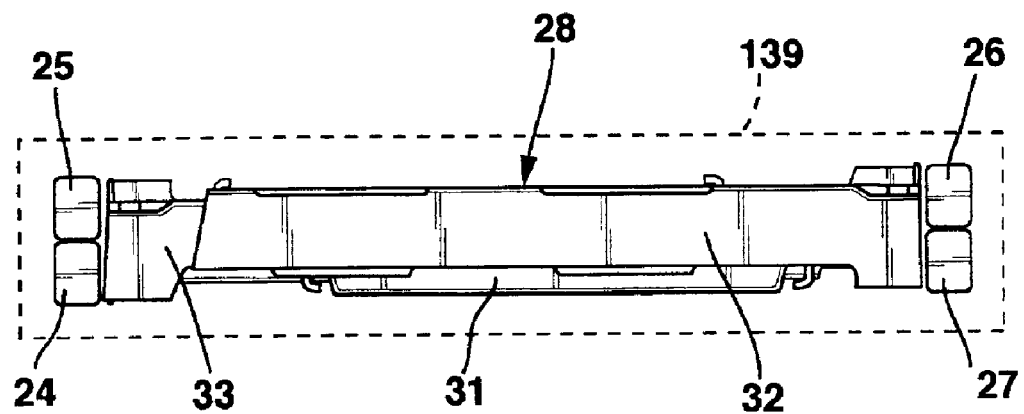
FIG. 33 is a bottom plan view of FIG. 29.

As shown in FIGS. 28, 29 and 31, locker shelves 28 and 29 are contracted with shelf members 32, 33 and 132, 133 in overlapped positions. Locker shelves 28 and 29 are in contacting end-to-end locations in the same general plane. A first pair of side-by-side legs 24 and 25 are located adjacent one side of the end-to-end locker shelves 28 and 29. The second pair of side-by-side legs 26 and 27 are located adjacent the other side of the end-to-end locker shelves 28 and 29. Legs 24 to 27 are located in the same general plane as locker shelves 28 and 29. Drawer 31 is in the nested position, shown in FIG. 27, within shelf member 33. The generally flat arrangement of shelf members, legs and drawer fits within the rectangular interior space of rectangular box 138.

While we have described a preferred embodiment of the invention, it should be understood that various changes, adaptations, and modifications may be made therein by persons skilled in the art without departing from the invention and the scope of the appended claims.

What is claimed is:

1. A shelf assembly comprising: a shelf having a top wall, a drawer located below the top wall of the shelf, means joined to the shelf slidably supporting the drawer for generally horizontal movement between closed and open positions relative to the shelf, said drawer having a transverse end wall, and a longitudinal rib joined to the top wall of the shelf and extended downwardly toward the drawer, said transverse end wall of the drawer being engageable with said rib to retain the drawer in a generally horizontal position during movement of the drawer relative to the means joined to the shelf slidably supporting the drawer between the closed and open positions of the drawer.

2. The shelf assembly of claim 1 wherein: said transverse wall is a rear transverse wall, said drawer having a transverse front end wall longitudinally spaced from the rear end wall, said rib having a longitudinal length less than the longitudinal distance between said front and rear end walls whereby the drawer when in the closed position can be moved upwardly adjacent the top wall of the shelf into nesting relationship with the shelf.

3. The shelf assembly of claim 1 wherein: the drawer has a bottom wall and upright side walls joined to the bottom wall, and longitudinal lips joined to and extended outwardly from the side walls, said means joined to the shelf slidably supporting the drawer comprising downwardly directed laterally spaced members having inwardly extended ledges, said longitudinal lips being located on the ledges to support the drawer for sliding movement between the open and closed positions of the drawer.

4. The shelf assembly of claim 1 wherein: the drawer has a bottom wall and upright side walls joined to the bottom wall, and longitudinal lips joined to and extended outwardly from the side walls, said means joined to the shelf slidably supporting the drawer comprising downwardly directed laterally spaced memlers having inwardly extended ledges located below the top wall of the shelf, said longitudinal lips being located on the ledges to support the drawer for sliding movement between the closed and open positions of the drawer, said transverse wall of the drawer is a rear transverse wall, said drawer having a front transverse wall longitudinally spaced from the rear transverse wall, said rib having a longitudinal length less than the longitudinal distance between said front and rear transverse walls whereby the drawer can be raised above the ledges to a position adjacent the top wall of the shelf whereby the drawer is in a nesting relationship with the shelf.

5. The shelf assembly of claim 4 wherein: said longitudinal rib is a longitudinal flat member located between the laterally spaced members, said flat member having a linear bottom edge engageable with the rear transverse end wall of the drawer to retain the drawer in a generally horizontal position when the drawer is in the open position.

6. The shelf assembly of claim 1 including: upright legs, and means connecting the legs to the shelf to support the shelf in a horizontal position.

7. The shelf assembly of claim 1 including: a plurality of legs, said legs and shelf having cooperating connecting means attaching the legs to the shelf to support the shelf in a horizontal position.

8. The shelf assembly of claim 7 wherein: said cooperating connecting means includes sleeves having holes in said legs and a pair of fingers on said shelf, said fingers extended through the holes and engageable with the sleeves to restnct movement of the legs relative to the shelf.

9. The shelf assembly of claim 1 wherein: said shelf has corner portions having outwardly open pockets, upright legs having portions located in said pockets, finger means joined to the corner portions extended into the pockets for connecting the legs to the shelf, said legs having sleeves with holes, said finger means extended through said holes and engageable with the sleeves to retain the legs on the shelf.

10. The shelf assembly of claim 9 wherein: said finger means comprise a pair of fingers extended through each hole, and outwardly extended heads on the fingers engageable with the sleeves to retain the legs on the shelf.

11. A shelf assembly comprising: a first shelf member, a second shelf member, said first and second shelf members having cooperating means slideably supporting the first shelf member on the second shelf member whereby the first and second shelf members are movable between contracted and expanded positions, members for retaining the first and second shelf means in selected positions, a drawer located below the second shelf member, means joined to the second shelf member slidably supporting the drawer for movement between open and closed positions relative to the second shelf member, said drawer having a bottom wall, upright side walls and front and rear end walls joined to the bottom wall, and outwardly directed lips joined to the side walls, said lips being engageable with the means slidably supporting the drawer for movement between open and closed positions, said second shelf member having a top wall, and a longitudinal rib joined to the top wall of the second shelf member and extended downwardly toward the bottom wall of the drawer, said rear end wall of the drawer being engageable with the rib to retain the drawer in a generally horizontal position during movement of the drawer relative to the means joined to the second shelf member slidably supporting the drawer between the closed and open positions of the drawer.

12. The shelf assembly of claim 11 wherein: the cooperating means slidably supporting the first shelf member on the second shelf member includes downwardly directed first side flanges on the first shelf member, inwardly directed bosses on the first side flanges, and downwardly directed second side flanges on the second shelf member located adjacent the first side flanges and engageable with the bosses to slidably retain the first and second shelf members in assembled relation.

13. The shelf assembly of claim 11 wherein: the means for retaining the first and second shelf members in selected positions includes a plurality of downwardly directed projections joined to the first shelf member, said projections being longitudinally spaced along the length to the first shelf member, and an upwardly directed detent joined to the second shelf member engageable with adjacent projections to hold the first and second shelf members in selected positions.

14. The shelf assembly of claim 11 wherein: said rib has a longitudinal length less than the longitudinal distance between said front and rear end walls whereby the drawer when in the closed position can be moved upwardly adjacent the top wall of the second shelf member into nesting relationship with the second shelf member.

15. The shelf assembly of claim 11 including: upright legs, and means connecting the legs to the first and second shelf members to support the first and second shelf members in a horizontal position.

16. The shelf assembly of claim 15 wherein: the means connecting the legs to the first and second shelf members includes sleeves having holes in said legs, and finger means on said first and second shelf members extended through said holes and engageable with said sleeves to restrict movement of the legs relative to the shelf members.

17. The shelf assembly of claim 11 wherein: each of said shelf members has corner portions having outwardly open pockets, upright legs having portions located in said pockets, finger means joined to the corner portions extended into the pockets for connecting the legs to the shelf members, said legs having sleeves having holes, said finger means extended through said holes and engageable with the sleeves to retain the legs on the shelf members.

18. The shelf assembly of claim 17 wherein: said finger means comprise a pair of fingers extended through each hole, and outwardly extended heads on the fingers engageable with the sleeves to retain the legs on the shelf members.

19. A leg for a shelf assembly comprising: a one-piece elongated linear member having a first side wail having a flat outside first surface, a second side wall having a flat outside second surface, said first and second surfaces being laterally spaced and parallel to each other, a transverse web located between and joined to the first and second side walls, and a plurality of sleeves joined to the web, said sleeves extended laterally from the web and surrounding transverse cylindrical holes.

20. The leg of claim 19 including: transverse walls joined to adjacent opposite ends of the first and second side walls.

21. The leg of claim 19 transverse ribs joined to the web and first and second side walls, said transverse rib being located adjacent opposite portions of each of the sleeves.

22. The leg of claim 21 including: longitudinal ribs joined to the web and adjacent transverse ribs.

23. The leg of claim 19 including: first and second end walls joined to opposite ends of the side walls, said sleeves including a first sleeve located adjacent the first end wall and a second sleeve located adjacent the second end wall, a first transverse rib joined to the web and first and second side walls located adjacent the first sleeve, and a second transverse rib joined to the web and first and second side walls located adjacent the second sleeve.

24. The leg of claim 23 wherein: each of said sleeves has opposite portions thereof joined to the first and second side walls.

25. The leg of claim 19 wherein: the web is a flat transverse web joined to middle inside portions of the first and second side walls, said sleeves extended laterally from opposite sides of the web, transverse ribs joined to opposite sides of the web and the first and second side walls, and longitudinal ribs joined to opposite sides of the web and adjacent transverse ribs.

26. A shelf assembly comprising: a shelf, upright legs for supporting the shelf in a horizontal position, said legs having upright side walls and sleeves located between the side walls, said sleeves having holes, said shelf having corner portions with pockets accommodating sections of the legs, each corner portion having laterally spaced first and second walls on opposite sides of a pocket, a pair of fingers attached to the shelf for each leg extended into a pocket, said fingers extended through one of the holes in said sleeves for each leg, and a head on the outer end of each finger engageable with the sleeve accommodating said pair of fingers to restrict outward movement of the leg relative to the shelf and holding portions of the side walls of the leg in firm engagement with the first and second walls of the corner portions of the shelf to restrict movement of the legs relative to the shelf.

27. A shelf assembly comprising: a shelf, upright legs for supporting the shelf in a horizontal position, said legs having upright side walls and sleeves located between the side walls, said sleeves having holes, said shelf having corner portions with pockets accommodating sections of the legs, each corner portion having laterally spaced first and second walls on opposite sides of a pocket, at least one finger attached to said shelf for each leg extended into a pocket, said finger extended through one of the holes in said sleeves and engageable with the sleeve accommodating the finger and holding portions of the side walls on the leg in firm engagement with the first and second walls of the corner portions of the shelf to restrict movement of the legs relative to the shelf, each of said corner portions having a third wall joined to the first and second walls, said finger being joined to the third wall and extended into the pocket between the first and second walls, a head on the outer end of the finger engageable with the sleeve accommodating the finger to retain portions of the leg in firm engagement with the third wall to restrict movement of the leg relative to the shelf.

28. The shelf assembly of claim 27 including: a pair of fingers attached to the corner portions of the shelf and extended into the pockets for each leg, a head on the outer end of each finger engageable with the sleeve accommodating said pair of fingers to restrict outward movement of the leg relative to the shelf.

29. A shelf assembly comprising: a first shelf member, a second shelf member, said first and second shelf members having cooperating means slidably supporting the first shelf member on the second shelf member whereby the first and second shelf members are movable between contracted and expanded positions, means for retaining the first and second shelf members in selected positions, upright legs for supporting the shelf members in a horizontal position, said legs having laterally spaced upright side walls and sleeves with holes along the length of said legs located between the side walls, said first and second shelf members having portions with pockets accommodating sections of the legs, each section having laterally spaced first and second walls on opposite sides of a pocket, and finger means on said first and second shelf members extended into said pockets and through said holes and engageable with said sleeves to hold the sections of the side walls of the legs in firm engagement with the first and second walls of the portions of the shelf members thereby restricting movement of the legs relative to the shelf members, each of said portions of the shelf members having a third wall joined to the first and second walls, said finger means being joined to the third wall and extended into the pocket between the first and second walls, a head on the end of the finger means engageable with the sleeve accommodating the finger means to retain portions of the leg in firm engagement with the third wall to restrict movement of the leg relative to the shelf.

30. The shelf assembly of claim 29 wherein: the cooperating means slidably supporting the first shelf member on the second shelf member includes downwardly directed first side flanges on the first shelf member, inwardly directed bosses on the first side flanges, and downwardly directed second side flanges on the second shelf member located adjacent the first side flanges and engageable with the bosses to slidably retain the first and second shelf members in assembled relation.

31. The shelf assembly of claim 29 wherein: the means for retaining the first and second shelf members in selected positions includes a plurality of downwardly directed projections joined to the first shelf member, said projections being longitudinally spaced along the length of the first shelf member, and an upwardly directed detent joined to the second shelf member engageable with adjacent projections to hold the first and second shelf members in selected positions.

32. The shelf assembly of claim 29 wherein: said finger means comprise a pair of fingers extended through each hole, and outwardly extended heads on the fingers engageable with the sleeves to retain the legs on the shelf members.

33. A shelf assembly comprising: a shelf including portions having outwardly open pockets and laterally spaced walls on opposite sides of the pockets, upright legs located in the pockets for supporting the shelf on a support, each of the legs comprising a one-piece elongated linear member having a first side wall having a flat outside first surface, a second side wall having a flat outside second surface, said first and second surfaces being laterally spaced and parallel to each other with opposite portions of the surfaces located in firm engagement with the laterally spaced walls of a portion of the shelf, a transverse web located between and joined to the first and second side walls, and a plurality of sleeves joined to the web, said sleeves extended laterally from the web and surrounding transverse cylindrical holes, and means extended through one hole in each leg connected to the portions of the shelf to retain the legs in the pockets with the first and second surfaces in firm engagement with the laterally spaced walls of the portions of the shelf.

34. The shelf assembly of claim 33 including: transverse walls joined to adjacent opposite ends of the first and second side walls.

35. The shelf assembly of claim 33 including: transverse ribs joined to the web and first and second side walls, said transverse ribs being located adjacent opposite portions of each of the sleeves.

36. The shelf assembly of claim 35 including: longitudinal ribs joined to the web and adjacent transverse ribs.

37. The shelf assembly of claim 33 including: first and second end walls joined to opposite ends of the side walls, said sleeves including a first sleeve located adjacent the first end wall and a second sleeve located adjacent the second end wall, a first transverse rib joined to the web and first and second side walls located adjacent the first sleeve, and a second transverse rib joined to the web and first and second side walls located adjacent the second sleeve.

38. The shelf assembly of claim 37 wherein: each of said sleeves has opposite portions thereof joined to the first and second side walls.

39. The shelf assembly of claim 33 wherein: the web is a flat transverse web joined to middle inside portions of the first and second side walls, said sleeves extended laterally from opposite sides of the web, transverse ribs joined to opposite sides of the web and the first and second side walls, and longitudinal ribs joined to opposite sides of the web and adjacent transverse ribs.

40. A shelf assembly comprising: a shelf including portions having outwardly open pockets, said portions having laterally spaced first and second walls on opposite sides of the pockets, and legs for supporting the shelf on a support, said legs having side walls and holes between the side walls, said side walls of the legs having portions located in firm engagement with the first and second walls of the shelf, and means extended through one of said holes in each leg connected to the portions of the shelf to retain the legs in the pockets with the portions of the legs in firm engagement with the first and second walls of the shelf to restrict movement of the legs relative to the shelf, the portions of the shelf having third walls extended between the first and second walls, said legs being retained in firm engagement with the third wall by the means extended through one of the holes in each leg connected to the portions of the shelf to restrict movement of the legs relative to the shelf, said means extended through one of the holes in each leg connected to the portions of the shelf comprising fingers joined to the third walls for holding the legs in firm engagement with the third walls.

* * * * *